United States Patent [19]
Cropper et al.

[11] 3,794,913
[45] Feb. 26, 1974

[54] PHASE INTERFACE INDICATOR

[75] Inventors: Wendell P. Cropper, Olympia Fields; Sixt Frederick Kapff; Robert B. Jacobs, both of Homewood, all of Ill.

[73] Assignee: Standard Oil Company, Chicago, Ill.

[22] Filed: May 18, 1972

[21] Appl. No.: 254,446

[52] U.S. Cl............. 324/65 P, 73/304 R, 324/30 B
[51] Int. Cl............................................. G01r 27/02
[58] Field of Search......... 324/65 P, 64, 65 R, 30 B; 73/304 R

[56] References Cited
UNITED STATES PATENTS

| | | | |
|---|---|---|---|
| 2,938,383 | 5/1960 | Blackburn | 73/304 |
| 1,910,021 | 5/1933 | Legg | 324/65 P |
| 2,379,106 | 6/1945 | Sanders | 73/304 R X |
| 2,412,363 | 12/1946 | Silverman | 73/304 R X |
| 2,786,661 | 3/1957 | Herzog et al. | 324/64 X |
| 2,922,103 | 6/1960 | Smith | 324/64 UX |
| 3,370,466 | 2/1968 | Chang | 73/304 R |
| 2,782,364 | 2/1957 | Shuler, Jr. et al. | 324/64 X |

FOREIGN PATENTS OR APPLICATIONS

| 995,922 | 6/1965 | Great Britain | 324/64 |
|---|---|---|---|

Primary Examiner—Stanley T. Krawczewicz

[57] ABSTRACT

Disclosed is an apparatus for detecting the location of the interface between two phases of matter of substantially different conductivity. The apparatus includes a plurality of insulated conductive members spaced along an axis and adapted for suitable electrical connections whereby it may be determined which of the conductive members are immersed in the conductive phase and which are in the non-conductive phase.

4 Claims, 5 Drawing Figures

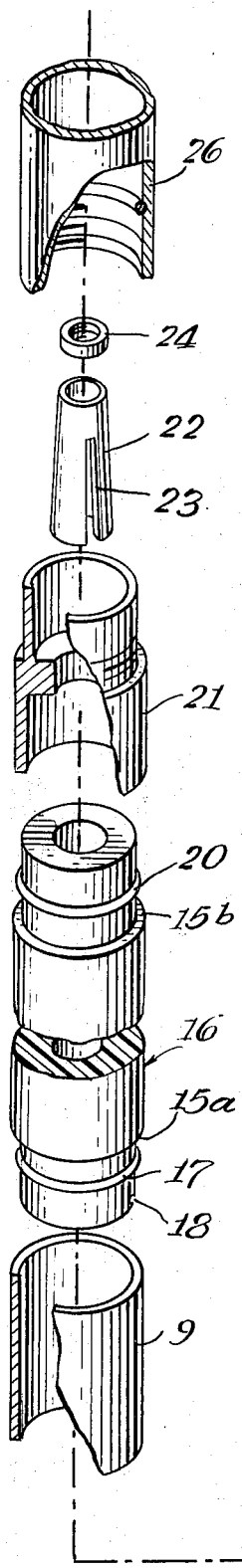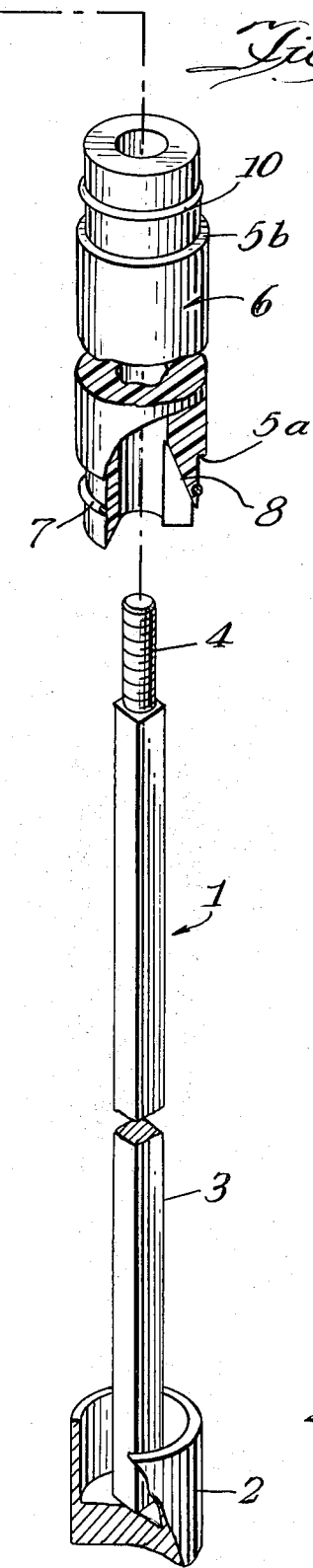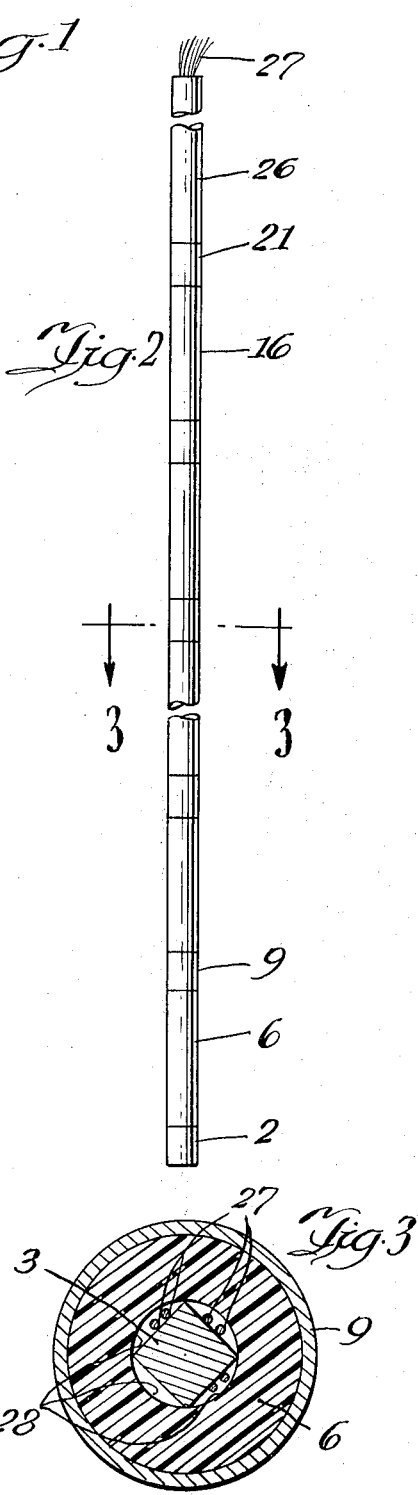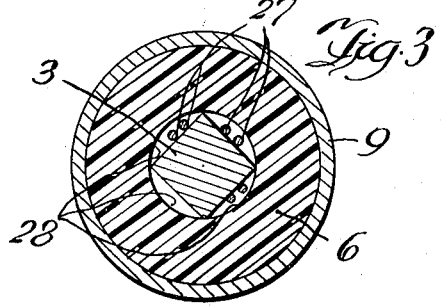

PHASE INTERFACE INDICATOR

SUMMARY OF THE INVENTION

Our invention concerns an apparatus which is useful in detecting the location of the interface between two phases of matter of substantially different conductivity. Such an apparatus is particularly useful for example in reactors, settling tanks, or storage tanks wherein the location of the interface cannot be visually observed. The ability to determine the location of this interface is often of great value to the process operator and enables him to adjust operations to maintain the most favorable conditions.

The apparatus of our invention includes a plurality of conductive members spaced apart from each other and located along an axis, each of these conductive members being insulated from each other, and each of these members being adapted to receive an a.c. current. In order to obtain a determination of whether particular conductive members are in the conductive phase or in the non-conductive phase, two alternate circuits are disclosed for obtaining an indication of the interface location. One circuit provides a continuous a.c. current through the conductive elements connected in series and the other supplies an a.c. current to selected conductive elements one at a time.

BRIEF DESCRIPTION OF THE DRAWINGS

FIG. 1 is an exploded perspective view, partly in section, showing the preferred apparatus of the present invention.

FIG. 2 is an elevational view of the apparatus of FIG. 1.

FIG. 3 is a section taken along lines 3—3 of FIG. 2.

DETAILED DESCRIPTION OF THE INVENTION

Figure 4:
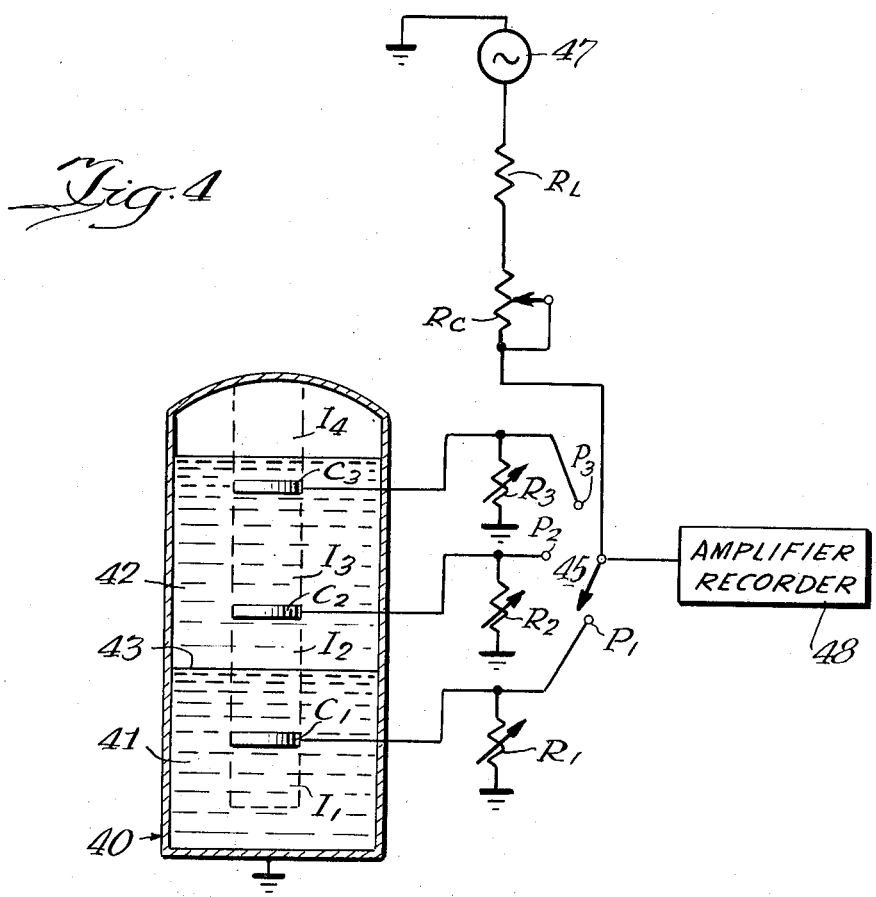
FIG. 4 is a schematic diagram showing one circuit suitable for use in conjunction with the apparatus.

The apparatus of our invention is useful wherever two phases of matter are present and these phases have substantially different conductivities. It may be used where a liquid and a gas phase are present or where two immiscible liquid phases are present. It is particularly useful for example where an acid phase and a hydrocarbon phase are present and is especially useful in conjunction with the alkylation of isoparaffins and olefins to produce gasoline blending stocks. During the alkylation reaction an acid is used as a catalyst, the most common acids being sulfuric acid and hydrofluoric acid. In order to maximize catalytic effect of the acid, the acid is normally mixed with the hydrocarbon to be alkylated so as to form an emulsion of the two immiscible phases. This maximizes contact area between the hydrocarbon and catalyst. Subsequent to this reaction, it is necessary to separate the acid and hydrocarbon phases. This is normally accomplished by directing the emulsion to a relatively quiescent settling zone wherein phase separation based upon density differences is permitted to occur. The two phases will form immiscible layers and separation is effected by separately drawing off the two phases. The best separation is obtained if one knows the location of the interface between these two phases and can adjust the locations and rates at which the separated phases are withdrawn accordingly. Our apparatus is designed to determine the location of this phase interface and is therefore of valuable assistance to the process operator.

The apparatus of our invention generally takes on an elongated configuration and preferably is a thin rod-shaped structure. The generally elongated configuration makes our apparatus particularly suitable for insertion into the vessel in question through a small valved pipe tee assembly. Our apparatus may then be periodically moved from one vessel to another in order to obtain data concerning the interface location or may be left permanently in a particular vessel. An apparatus having a straight line axis is preferred because of the ease of construction. Where the vessel in question is not suited for such an apparatus, a specially designed apparatus having a curved axis may be employed. To be operational it is only necessary that our apparatus be located and designed so as to extend across the entire range of possible interface locations so as to be capable of detecting the interface location in all instances.

The preferred apparatus of our invention is illustrated in FIG. 1. The major components of the apparatus are support member 1 insulating members 6 and 16, a conductive element 9 and a closure means composed of parts 21, 22, 24 and 26. The support member 1 is constructed of a rigid material, suitably a metal, and comprises a base 2, a support rod 3, and a threaded top connection means 4. Carpenter-20 steel, manufactured by the Carpenter Steel Company, is a suitable metal especially designed for sulfuric acid service. Other similar metals may be substituted. The length of the support member is dependent upon the vessel in which the apparatus is to be employed. The cross section of the support rod and the design of the base and threaded top connection means will depend upon the design of the insulating and conductive members as well as the top closure means as hereinafter discussed.

The insulating members 6 and 16 are composed of a suitable nonconductive material which will not deteriorate in the environment to which the apparatus is exposed. Where the apparatus is to be used with sulfuric acid in alkylation the insulating elements may be constructed of glass filled polytetrafluoroethylene. The insulating members are annular in shape, have a recess 5A, 5B and 15A, 15B at each end. Each insulating member is also adapted to receive an O-ring at each end as illustrated by O-rings 7, 10, 17 and 20. It is necessary to provide each insulating member which is adjacent a conductive element with a wire passageway. Though every insulating element need not have a wire passageway, the advantages of interchangeability and ease of construction make it preferable to make all insulating elements identical. Thus, in FIG. 1 a wire passageway is shown at 8 of insulating element 6 and at 18 of insulating element 16. Wire passageway 8 will not be used because a wire is not connected to the base support member. On the other hand, wire passageway 18 will be occupied by a wire extending from element 9 through the passageway. The internal diameter of the insulating members is approximately the same as the distance between the opposite edges of the support rod so that when the insulating member is placed upon the support rod it will be held firmly in place.

Conductive element 9 is also annular in shape and has an external diameter substantially the same as that of the insulating members and has an internal diameter the same as or slightly larger than the external diameter of the recessed portion of the insulating elements. It may be constructed of any conductive material suitable in light of the environment of which the apparatus is to be used. Again, Carpenter-20 Steel is appropriate in sulfuric acid service.

The top closure means is composed of four separate parts. The lower part of 21 has the same cross section as a conductive element permitting it to be placed in sealing engagement upon the recess of the upper most insulating member, while the top portion of part 21 is adapted to receive part 22, and the middle portion of part 21 is annular in cross section having an internal diameter the same as that of the insulating member. Part 22 has a port 23 in the form of a slot through which wires, not shown, may extend. Nut 24 is designed to hold the entire apparatus in place when threaded upon threads 4 of the support member 1; 26 is then threaded onto 21 in order to prevent the wires extending through slot 23 from coming in contact with environmental materials.

The apparatus is assembled by stacking on the support member first an insulating member than a conductive member and then another insulating member and continuing in this alternating fashion and concluding with an upper most insulating member. The number of conductive elements employed will depend upon the vessel to be monitored and the accuracy of the results desired. Parts 21, 22, 24 and 26 are then assembled in the manner shown in FIG. 1. As mentioned, wires are connected to each of the conductive members at their inner-surface and approximately halfway between the edges thereof. These wires extend through the wire passageway into the insulating member and along a channel defined by the space between support rod 3 and the inner surface of the insulating members. (This channel is best shown in FIG. 3.) The wires then extend along the channel and exit from the channel through port 23 and extend out of the apparatus through port 26 where appropriate electrical connections are made.

FIG. 2 depicts the apparatus of our invention as assembled. Bottom insulating member 6 is in sealing engagement with base member 2. Conductive element 9 is in sealing engagement with insulating member 6. Insulating and conductive members are placed upon support member alternatingly to obtain an apparatus of the desired length. The top insulating member 16 is sealed by top member 21 and the wires 27 extend from the apparatus through protective member 26.

FIG. 3 depicts a cross section of the apparatus as taken along line 3—3 of FIG. 2. Conductive element 9 is in sealing engagement with insulating element 6 which is in turn held in place by support rod 3. Wires 27 are shown passing along channel 28.

FIG. 4 illustrates schematically a circuit useful with our apparatus. Grounded tank 40 contains two immiscible liquids 41 and 42 having an interface 43. Our apparatus having conductive elements $C_1$, $C_2$ and $C_3$ and insulating elements $I_1$, $I_2$, $I_3$ and $I_4$ is immersed in the liquids. Each of the conductive elements is connected to a contact point of the electrical switch 45 and is grounded through a corresponding resistor $R_1$, $R_2$ or $R_3$ in parallel with the switch connection. An external source of alternating current 47 is then connected in series to a particular conductive element through the electrical switch. Amplifier and recorder 48 are connected to the circuit at or near the switch, on the same side of the switch as the alternating current source is located, to obtain an indication of the circuit voltage at that point. An indication of the phase interface location can be obtained as follows: switch 45 is adjusted to provide a circuit through contact $P_1$ and a current is therefore applied to the lower most conductive element $C_1$. In this instance the lower phase has a much higher conductivity than the upper phase and a current will therefore pass through the switch to $C_1$ and, because of the high conductivity of the liquid surrounding the element, the current will be transmitted through the liquid to the grounded vessel wall, 40. This path will be chosen in preference to the parallel path through resistor $R_1$ to ground since the resistance of the liquid is much less than that of $R_1$. In effect, the switch portion of the circuit comes to ground potential because it is shorted to ground through the conductive element. An indication on the recorder that $C_1$ is at ground potential establishes the presence of the conductive liquid at that point. Switch 45 is then adjusted to complete a circuit through contact $P_2$ and open the circuit through $P_1$. As depicted in the schematic, the middle conductive member $C_2$ is located in the non-conductive phase. Therefore current supplied to $C_2$ will meet a high resistance when attempting to flow through the non-conductive liquid to the vessel wall. Since the resistor $R_2$ was preadjusted so as to make that resistance considerably less than that of the nonconductive liquid, but considerably greater than that of the conductive liquid, the current will take the path of least resistance and pass through resistor $R_2$ rather than through $C_2$, and as a result, switch 45 is no longer at ground potential. An indication of this fact is recorded and informs the operator that the interface is located between the first and second conductive elements. Resistor $R_L$ and $R_C$ are placed in the circuit in order to guarantee that the magnitude of the alternating current is maintained at a safe level. This circuitry is particularly adapted for use with a multi-point recorder designed to periodically obtain an indication of the potential at predetermined locations.

Figure 5:
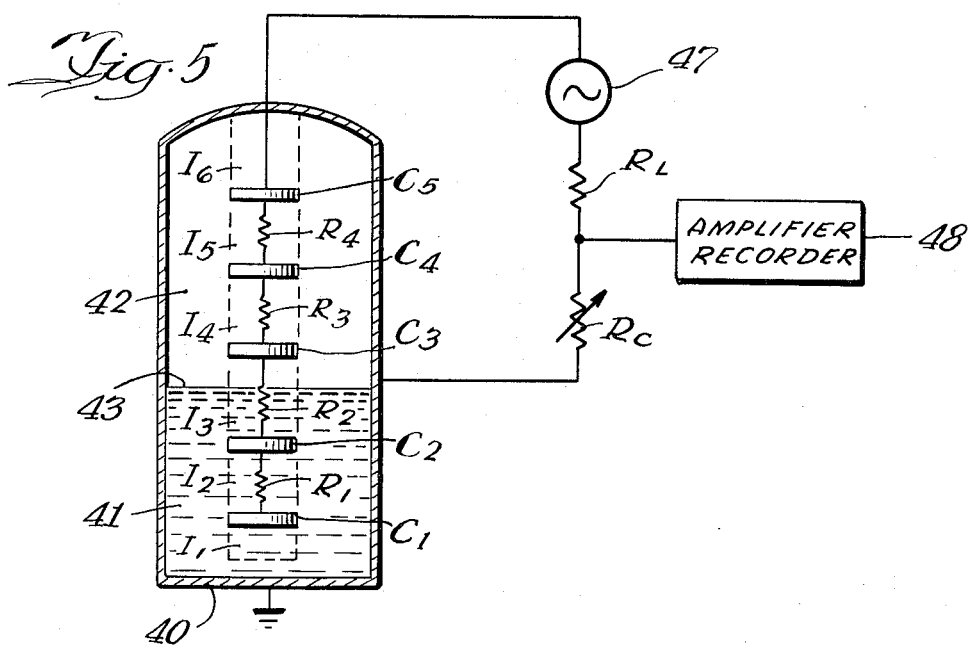
FIG. 5 is a schematic diagram showing a second circuit useful in connection with the invention apparatus.

FIG. 5 schematically illustrates a second type of circuit useful in our invention. In this case each of the conductive elements and insulating elements $I_1$, $I_2$, $I_3$, $I_4$, $I_5$, and $I_6$ is connected in series through appropriate resistors $R_1$, $R_2$, $R_3$ and $R_4$ located between each adjacent pair of elements. Again, resistors $R_L$ and $R_C$ are included in the circuit to maintain the generated current at a safe level. The circuit is completed by including an alternating current source connected to the last conductive element of the series and through resistors $R_L$ and $R_C$ to ground. Current will travel through the circuit and through each conductive element located in the non-conductive phase. In doing so, the current will pass through the resistor associated with each element in the non-conductive phase. The current will however pass through only the upper-most conductive element located in the conductive phase. For the system shown in FIG. 5, current will not pass through $R_1$, because the path of least resistance from conductive element $C_2$ is through the conductive liquid and to the grounded vessel wall and not through $R_1$ to $C_1$ and then to the vessel wall. Consequently the overall resistance of the circuit, the current, and the voltage at a particular point are a function of the location of the phase interface. Monitoring any one of these parameters will then give the location of the phase interface in this system. The amplifier and recorder may be pre-calibrated to read the location of the phase interface directly. This system is particularly suitable for use with a recording device adapted to give a continuous reading of the phase interface location.

We claim:

1. An apparatus useful in detecting the location of the interface between two phases of matter of substantially different conductivity comprising:
   a. a base;
   b. a rod-shaped support member extending from said base and having three or more edges;
   c. alternating insulating and conductive annules stacked on said base and support member interconnected by male-female coupling adapted to receive O-rings and with internal diameter large enough to accommodate the support rod but keep the edges of said rod in approximate contact with the internal circumference thereby forming channels adapted to carry wires;
   d. wires connected to said conductive annules and passing through said channels; and
   e. an outer-closure means attached to said rod which holds said alternating insulating and conductive annules in place.

2. An apparatus of claim 2 wherein the insulating members are made from glass filled polytetrafluoroethane.

3. An apparatus useful in detecting the location of the interface between two phases of matter of substantially different conductivity comprising:
   a. a base;
   b. a rod-shaped support member extending from said base and having three or more edges and a threaded top;
   c. alternating insulating and conductive annules stacked on said base and support member with the insulating annules acting as male couplings having recesses at each end adapted to receive O-rings and containing wire passageways from the surface of the recessed ends to the interior surface of said annules and with internal diameter large enough to accommodate the support rod but keep the edges of said rod in approximate contact with the internal circumference thereby forming channels adapted to carry wires and with said conductive annules acting as female couplings having external diameter approximately the same as that of the insulating annules and internal diameter at least as large as the external diameter of the recessed portion of the insulating annules;
   d. wires connected to said conductive annules and passing through said passageways and channels; and
   e. an outer-end configuration of four parts which holds said alternating insulating and conductive annules in place on the support rod consisting of:
      1. an annule having a female coupling at the inner end nearest the base with external diameter approximating the same as that of the insulating annules and internal diameter at least as large as the external diameter of the recessed portion of the last insulating annule and having a threaded male coupling at the outer end of smaller external diameter than the inner end, said annule having an interior ledge between the outer and inner portions;
      2. a frusto-conical sleeve of suitable size to fit inside said outer threaded male coupling on said ledge and having such length that the threaded end of said support rod extends beyond the end of said sleeve when annular part (1) is stacked on the support rod, and said sleeve having a narrow port in its side to allow wires running along the support rod to pass out;
      3. a nut which screws on the threaded end of said support rod extending out of said frusto-conical sleeve; and
      4. a top-end coupling with external diameter approximately the same as that of the insulating annules and threaded internal diameter of suitable size to tighten on said threaded male coupling at the outer end of annular part (1).

4. An apparatus of claim 3 wherein the insulating members are made from glass filled polytetrafluoroethane.

* * * * *

PO-1050
(5/69)

UNITED STATES PATENT OFFICE
CERTIFICATE OF CORRECTION

Patent No. __3,794,913__  Dated __February 26, 1974__

Inventor(s) __Wendell P. Cropper, Sixt Fredrick Kapff, and Robert B. Jacobs__

It is certified that error appears in the above-identified patent and that said Letters Patent are hereby corrected as shown below:

1) In Claim 2 at column 5, line 25:

"An apparatus of claim 2" should read

-- An apparatus of claim 1 --;

2) In Claim 3 at column 6, line 16:

"approximating" should read -- approximately --

Signed and sealed this 16th day of July 1974.

(SEAL)
Attest:

McCOY M. GIBSON, JR.
Attesting Officer

C. MARSHALL DANN
Commissioner of Patents